United States Patent
Norton et al.

(10) Patent No.: US 9,493,885 B2
(45) Date of Patent: Nov. 15, 2016

(54) LITHIUM-ION BATTERIES WITH NANOSTRUCTURED ELECTRODES AND ASSOCIATED METHODS OF MAKING

(75) Inventors: M. Grant Norton, Pullman, WA (US); Uttara Sahaym, Pullman, WA (US); Sarah Miller, Evanston, IL (US)

(73) Assignee: WASHINGTON STATE UNIVERSITY, Pullman, WA (US)

( * ) Notice: Subject to any disclaimer, the term of this patent is extended or adjusted under 35 U.S.C. 154(b) by 520 days.

(21) Appl. No.: 13/576,000

(22) PCT Filed: Feb. 11, 2011

(86) PCT No.: PCT/US2011/024598
§ 371 (c)(1),
(2), (4) Date: Aug. 20, 2012

(87) PCT Pub. No.: WO2011/100591
PCT Pub. Date: Aug. 18, 2011

(65) Prior Publication Data
US 2012/0313587 A1 Dec. 13, 2012

Related U.S. Application Data

(60) Provisional application No. 61/304,313, filed on Feb. 12, 2010.

(51) Int. Cl.
*H02J 7/00* (2006.01)
*C25D 5/18* (2006.01)
(Continued)

(52) U.S. Cl.
CPC .............. *C25D 5/18* (2013.01); *C25D 21/02* (2013.01); *C25D 21/10* (2013.01); *C25D 21/12* (2013.01);
(Continued)

(58) Field of Classification Search
CPC ........ C25D 5/18; C25D 21/02; C25D 21/12; C25D 21/14; C25D 21/10; H01M 4/80; H01M 4/661; H01M 4/75; H01M 4/1395; H01M 4/387; H01M 4/0452; H01M 4/0461; H01M 4/134; Y02E 60/122
See application file for complete search history.

(56) References Cited

U.S. PATENT DOCUMENTS 6,334,939 B1    1/2002  Zhou et al.
6,465,132 B1 * 10/2002  Jin ............................. 429/231.8
(Continued)

FOREIGN PATENT DOCUMENTS

CN    1447916 A     10/2003
EP    0997543 A1     5/2000
(Continued)

OTHER PUBLICATIONS

International Search Report and Written Opinion issued Jan. 7, 2013, in International Application No. PCT/US2012/040625.
(Continued)

*Primary Examiner* — Naum B Levin
(74) *Attorney, Agent, or Firm* — Dorsey & Whitney LLP

(57) ABSTRACT

Several embodiments related to lithium-ion batteries having electrodes with nanostructures, compositions of such nanostructures, and associated methods of making such electrodes are disclosed herein. In one embodiment, a method for producing an anode suitable for a lithium-ion battery comprising preparing a surface of a substrate material and forming a plurality of conductive nanostructures on the surface of the substrate material via electrodeposition without using a template.

11 Claims, 15 Drawing Sheets

(51) Int. Cl.
H01M 4/04 (2006.01)
H01M 4/1395 (2010.01)
H01M 4/38 (2006.01)
C25D 21/02 (2006.01)
C25D 21/10 (2006.01)
C25D 21/12 (2006.01)
C25D 21/14 (2006.01)
H01M 4/66 (2006.01)
H01M 4/75 (2006.01)
H01M 4/80 (2006.01)
H01M 4/134 (2010.01)

(52) U.S. Cl.
CPC ............ C25D 21/14 (2013.01); H01M 4/0452 (2013.01); H01M 4/1395 (2013.01); H01M 4/387 (2013.01); H01M 4/661 (2013.01); H01M 4/75 (2013.01); H01M 4/80 (2013.01); H01M 4/0461 (2013.01); H01M 4/134 (2013.01); Y02E 60/122 (2013.01)

(56) References Cited

U.S. PATENT DOCUMENTS

| | | | |
|---|---|---|---|
| 6,599,662 | B1 | 7/2003 | Chiang et al. |
| 7,745,047 | B2* | 6/2010 | Zhamu et al. ............ 429/231.8 |
| 7,939,218 | B2* | 5/2011 | Niu ............................ 429/532 |
| 8,119,288 | B2* | 2/2012 | Zhamu et al. ............ 429/231.8 |
| 8,546,020 | B2* | 10/2013 | Lopatin et al. ............ 429/238 |
| 8,669,011 | B2* | 3/2014 | Lopatin et al. ............ 429/238 |
| 8,795,885 | B2* | 8/2014 | Prieto et al. ............... 429/209 |
| 2002/0027072 | A1 | 3/2002 | Cui et al. |
| 2005/0074671 | A1 | 4/2005 | Sugiyama et al. |
| 2006/0286456 | A1* | 12/2006 | Fu et al. ..................... 429/231.1 |
| 2007/0148547 | A1* | 6/2007 | Duh et al. .................. 429/231.8 |
| 2007/0212538 | A1* | 9/2007 | Niu ............................ 428/367 |
| 2007/0257264 | A1 | 11/2007 | Hersee et al. |
| 2008/0020282 | A1* | 1/2008 | Kim et al. ................. 429/231.8 |
| 2009/0001009 | A1 | 1/2009 | Linder et al. |
| 2009/0053608 | A1* | 2/2009 | Choi et al. .............. 429/231.95 |
| 2009/0117467 | A1* | 5/2009 | Zhamu et al. ............ 429/231.8 |
| 2009/0169996 | A1 | 7/2009 | Zhamu et al. |
| 2009/0214942 | A1 | 8/2009 | Frank et al. |
| 2009/0214956 | A1* | 8/2009 | Prieto et al. ................. 429/310 |
| 2009/0246625 | A1 | 10/2009 | Lu |
| 2009/0316335 | A1 | 12/2009 | Simon et al. |
| 2010/0261071 | A1* | 10/2010 | Lopatin et al. .............. 429/345 |
| 2010/0279003 | A1 | 11/2010 | Au |
| 2010/0297502 | A1* | 11/2010 | Zhu et al. .................. 429/231.8 |
| 2010/0310941 | A1 | 12/2010 | Kumta et al. |
| 2011/0111296 | A1 | 5/2011 | Berdichevsky et al. |
| 2012/0034512 | A1* | 2/2012 | Zhang et al. ................ 429/163 |
| 2012/0313587 | A1 | 12/2012 | Norton et al. |
| 2014/0315085 | A1* | 10/2014 | Norton et al. ............... 429/219 |
| 2015/0357629 | A1 | 12/2015 | Mackay et al. |

FOREIGN PATENT DOCUMENTS

| | | |
|---|---|---|
| JP | 2004178970 A | 6/2004 |
| WO | 2009105773 A2 | 8/2009 |
| WO | 2011100591 A1 | 8/2011 |
| WO | 2012170311 A2 | 12/2012 |

OTHER PUBLICATIONS

X. Zhao et al., "Electrochemical performance of Sn film reinforced by Cu nanowire," Electrochimica Acta vol. 55, Issue 20, Aug. 1, 2010, pp. 6004-6009.

International Search Report and Written Opinion issued Feb. 11, 2011, in International Application No. PCT/US2011/024598.

Cao et al. Growth of ZnO Nanoneedle Arrays with Strong Ultraviolet Emissions by Electrochemical Deposition Method, 2006, Crystal Growth and Design. vol. 6, No. 5, pp. 1091-1095.

Office Action issued in Chinese Application No. 201180008938.2, mailed May 9, 2014, 7 pages.

ISR&WO issued in PCT/US14/13366, mailed May 14, 2014, 9 pages.

K.E. Aifantis and S.A. Hackney, "Nanoscale Engineering for the Mechanical Integrity of Li-Ion Electrode Materials," Nanostructured Materials in Electrochemistry, 2008, 319-347.

Chan, et al., "High-performance lithium battery anodes using silicon nanowires," Nature Nanotechnology, 2008, vol. 3 31-35.

M.H. Park et al, "Silicon Nanotube Battery Anodes," Nano Letters, Pub. online Sep. 11, 2009, 3844-3847.

Z. Wang, W. Tian and X. Li, "Synthesis and electrochemistry properties of Sn-Sb ultrafine particles as anode of lithium-ion ion batteries," Journal of Alloys and Compounds, 2007, 350-354.

J. Kim, S. Khanal, A. Khatri, M. Islam and D. Choi, "Electrochemical characterization of vertical arrays of tin nanowires grown on silicon substrates as anode materials for lithium rechargeable microbatteries," Electrochemistry Communications, Oct. 2008, 1688-1690.

M.J. Deng et al, "Fabrication of Porous Tin by Template-Free Electrodeposition of Tin Nanowires from an Ionic Liquid," Electrochemical and Solid-State Letters, 2008, vol. 11, Issue 11, D85-D88.

J.P. Winterstein, M.G. Norton, "The influence of porosity on whisker growth in electroplated tin films," Journal of Materials Research, Dec. 21, 2006, vol. 21, No. 12, 2971-2974.

U. Sahaym, S.L. Miller, and M.G. Norton, "Effect of plating temperature on Sn surface morphology," Materials Letters, 64, 2010, 1547-1550.

S.M. Miller, U. Sahaym, M.G. Noton, "Effect of Substrate Composition on Sn Whisker Growth in Pure Sn Films," Metallurgical and Materials Transactions, Dec. 2010, vol. 41A, 3386-3395.

Dunn, B.D., "A Laboratory Study of Tin Whisker Growth," ESA Report, STR-223, 1987, 1-51.

Galyon, GT,Palmer, L., "An Integrated Theory of Whisker Formation: The Physical Metallurgy of Whisker Formation and the Role of Internal Stresses," IEEE Transactions on Electronics Packaging, V. 28, 2005, 17-30.

Directive 2002-95-EC of the European Parliament on restriction of hazardous substances, 2003, L37/19-L37/23.

Stafford GR, et al, "Whisker Formation in PB-Free Surface Finishes," ECS Transactions, 2006, vol. 1, Issue 13, 71-85.

Lee BZ, Lee DN, "Spontaneous Growth Mechanism of Tin Whiskers," Acta Metallurgical, vol. 46, 1998, 3701-3714.

Kakeshita, Kawanaka, Hasegawa, "Grain size effect of electroplated tin coatings on whisker growth," Journal of Material Science, 1982, 17-9, 2560-2566.

Lu, MH, Hsieh KC, "Sn-Cu Intermetallic Grain Morphology Related to Sn Layer Thickness," Journal of Electronic Materials, 2007, vol. 36, 1448-1454.

Chen YJ, Chen CM, "Mitigative Tin Whisker Growth Under Mechanically Applied Tensile Stress," Journal of Electronic Materials, 2009, vol. 38, 415-419.

Chen CM, Chen YJ, "Growth orientation of the tin whiskers on an electrodeposited Sn thin film under three-point bending," Journal of Materials Letters, 2009; vol. 38, 1517-1520.

Southworth AR et al, "Effect of strain on whisker growth in matte tin," Soldering & Surface Mount Technology, 2008, vol. 20, Issue 1, 4-7.

Schetty R, "Minimization of tin whisker formation for lead-free electronics finishing," Circuit World, 2001, vol. 27, 17-20.

Mathew S, Osterman M, Pecht M, Dunlevey F, "Evaluation of pure tin plated copper alloy substrates for tin whiskers,", Circuit World, 2009, vol. 35, 3-8.

Panagarov NA, "Preferred Orientations in Electro-deposited Metals," Journal of Electroanalytical Chemistry, 1965, vol. 9, 70-85.

Teshigawara T, Nakata T, Inoue K, Watanabe T, "Microstructure of Pure Tin Electrodeposited Films," Scripta Materialia, 2001, vol. 44, 2285-2289.

He A, Liu Q, Ivey DG, "Electrodeposition of tin: a simple approach," Journal of Material Science, 2008, vol. 19, 553-562.

Watanabe T, "Nano-Plating," 1st Edition, 2004, 97-139, 257-259, 358-368, 533-544.

(56) References Cited

OTHER PUBLICATIONS

Barnard AS, Zapol P, Curtiss, "Modeling the Morphology and Phase Stability of TiO2 Nanocrystals in Water," Journal of Chemical Theory and Computation, 2005, vol. 1, 107-116.
Selloni A, "Anatase Shows its Reactive Side," Nature Materials, 2008, vol. 7, 613-615.
"Template-Free Electrochemical Synthesis of Sn Nanostructures for Li-ion Battery Applications," accessed at http://www.ibridgenetwork.org/washington_state_university/template-free-electrochemical-synthesis-of-sn-nanostructures-for-li-ion-battery-applications, posted on Jan. 30, 2012, p. 1.
"Template-free Synthesis of SnO2 Hollow Nanostructures for Lithium Battery Storage," accessed at http://www.ipi-singapore.org/cos/o.x?ptid=1071682&;c=/ipi/ipcat&func=preview&rid=213, available at least as of Jan. 15, 2014, pp. 1-2.
Besenhard, J.O., et al., "Will advanced lithium-alloy anodes have a chance in lithium-ion batteries?," Journal of Power Sources, vol. 68, No. 1, pp. 87-90 (Sep. 1997).
Du, Z., et al., "Nanocone-arrays supported tin-based anode materials for lithium-ion battery," Journal of Power Sources, vol. 196, No. 22, pp. 9780-9785 (Aug. 9, 2011).
Extended European Search Report for counterpart Patent Application No. 11742898.7 mailed Oct. 31, 2014.
Extended European Search Report for counterpart Patent Application No. 12796057.3 mailed Oct. 31, 2014.
Keil, P., et al., "Investigation of Room Temperature Oxidation of Cu in Air by Yoneda-XAFS," AIP Conf. Proc., vol. 882, No. 1, pp. 490-492 (Feb. 2007).
Mackay, D.T., et al., "Template-free electrochemical synthesis of tin nanostructures," Journal of Materials Science, vol. 49, No. 4, pp. 1476-1483 (Dec. 2013).
Norton, M. G., "Washington State University to Present on Tin Nanoneedles: A Technology for Lithium-ion Batteries, at Knowledge Foundation's Next Generation Batteries 2013 Conference," accessed at http://www.prweb.com/releases/2013/3/prweb10524232.htm, Mar. 13, 2013, pp. 1-2.
Raj, D.V., et al., "Electrodeposition of Sno2 nanoneedles on anodized copper substrates and its electrochemical performance," AIP Conf. Proc, vol. 1536, pp. 151-152 (2013).
Saadat, S., et al., "Template-Free Electrochemical Deposition of Interconnected ZnSb Nanoflakes for Li-Ion Battery Anondes," Chemistry of Materials, vol. 23, No. 4, pp. 1032-1038 (2011).
U.S. Appl. No. 14/122,559, Nov. 2, 2015, Office Action.
Liu et al. "ZnO Nanoneedle Arrays Directly Grown on Bulk Nickel Substrate for Li Ion Battery Electrodes with Improved Performance" 2008 2nd IEEE International Nanoelectronics Conference (INEC 2008) pp. 53-57.

* cited by examiner

LITHIUM-ION BATTERIES WITH NANOSTRUCTURED ELECTRODES AND ASSOCIATED METHODS OF MAKING

CROSS-REFERENCE TO RELATED APPLICATION(S)

This application is a U.S. National Stage filing under U.S.C. §371 of International Application No. PCT/US2011/024598 filed Feb. 11, 2011, which claims priority to U.S. Provisional Application No. 61/304,313, filed on Feb. 12, 2010, the disclosure of which is incorporated herein by reference in its entirety.

TECHNICAL FIELD

The present disclosure is related generally to lithium-ion batteries. In particular, the present disclosure is related to lithium-ion batteries having electrodes with tin (Sn) nanostructures and associated compositions and methods for making such nanostructures.

BACKGROUND

Lithium-ion batteries are commonly used in consumer electronics because of their high energy-to-weight ratio, low or no memory effect, and long charge-holding ability when not in use. In addition to applications in consumer electronics, lithium-ion batteries are growing in popularity for defense, automotive, and aerospace applications. These new applications impose a continued need to improve the energy density of lithium-ion batteries.

Conventional lithium-ion batteries typically have a carbon-based anode. However, the carbon-based anode tends to limit the charging capacity of the lithium-ion batteries. For example, lithiation of a carbon-based anode can produce a charging capacity of about 372 mA·h/g, while lithiation of tin (Sn) can produce a charging capacity of about 990 mA·h/g, and lithiation of silicon (Si) can produce a charging capacity of about 4,200 mA·h/g. However, lithiation (which may also be referred to as "insertion") of lithium in both tin and silicon is known to be associated with about 300% volume change. As a result, after a few charge/discharge cycles, a tin- or silicon-based anode would be pulverized, and thus the charging capacity of the lithium-ion battery would be reduced. Accordingly, certain improvements in lithium-ion battery design and construction are needed.

BRIEF DESCRIPTION OF THE DRAWINGS

FIGS. 15A-E are SEM images of a sample undergoing the stages of FIG. 14.

DETAILED DESCRIPTION

This document describes battery systems, devices, and associated methods of making. In particular, several embodiments are related to lithium-ion batteries having electrodes with nanostructures, compositions of such nanostructures, and associated methods of making such electrodes. Several of the details set forth below are provided to describe the following embodiments and methods in a manner sufficient to enable a person skilled in the relevant art to practice, make, and use them. Several of the details and advantages described below, however, may not be necessary to practice certain embodiments and methods of the technology. Additionally, the technology may include other embodiments and methods that are within the scope of this disclosure but are not described in detail.

Figure 1A:
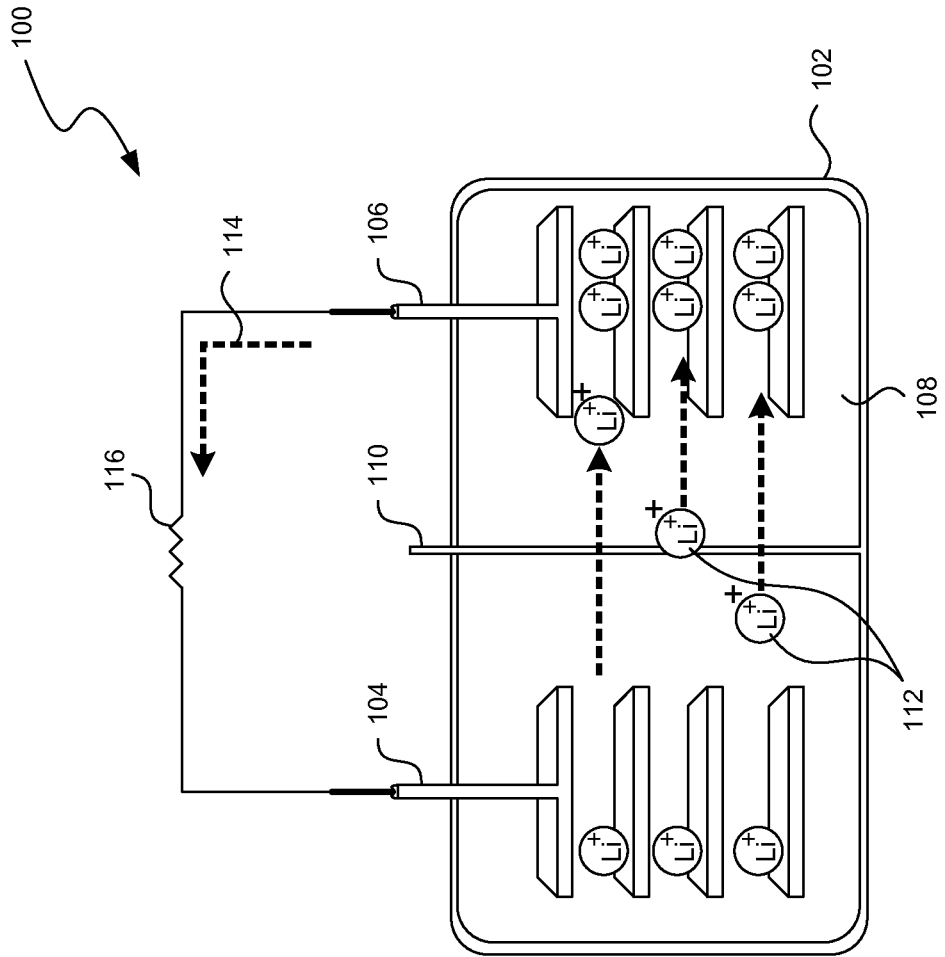
FIG. 1A is a schematic diagram of a lithium-ion battery during discharging in accordance with embodiments of the technology.
Figure 1B:
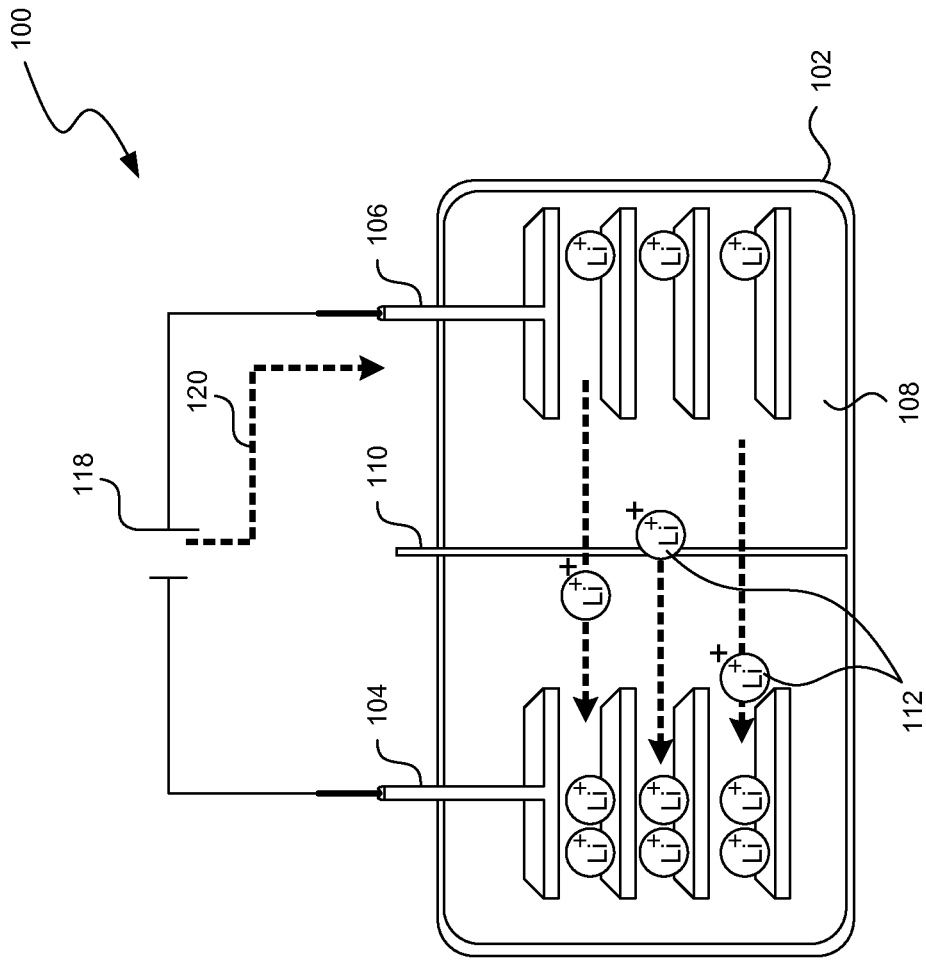
FIG. 1B is a schematic diagram of a lithium-ion battery during charging in accordance with embodiments of the technology.

FIG. 1A is a schematic diagram of a lithium-ion battery 100 during discharging, and FIG. 1B is a schematic diagram of the lithium-ion battery 100 during charging in accordance with embodiments of the technology. As shown in FIGS. 1A and 1B, the lithium-ion battery 100 can include a container 102 holding an anode 104, a cathode 106, an electrolyte 108, and an optional membrane 110 in the electrolyte 108. Even though only certain components are illustrated in FIGS. 1A and 1B, in other embodiments, the lithium-ion battery 100 can also include insulators, gaskets, vent holes, and/or other suitable components (not shown). In further embodiments, the membrane 110 may be omitted.

Figure 3:
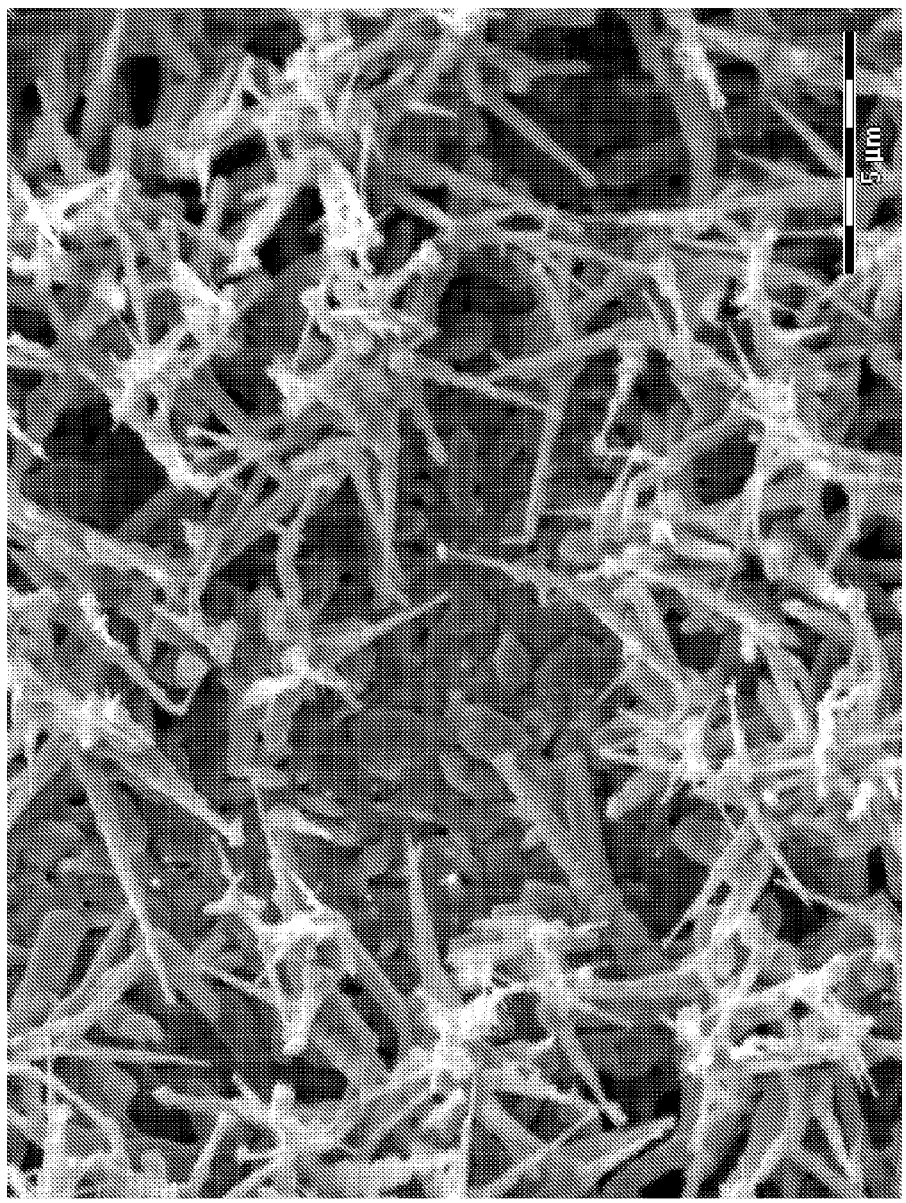
FIG. 3 is a scanning electron microscope (SEM) image of a sample formed according to several embodiments of the method of FIG. 2 in accordance with embodiments of the technology.
Figure 4:
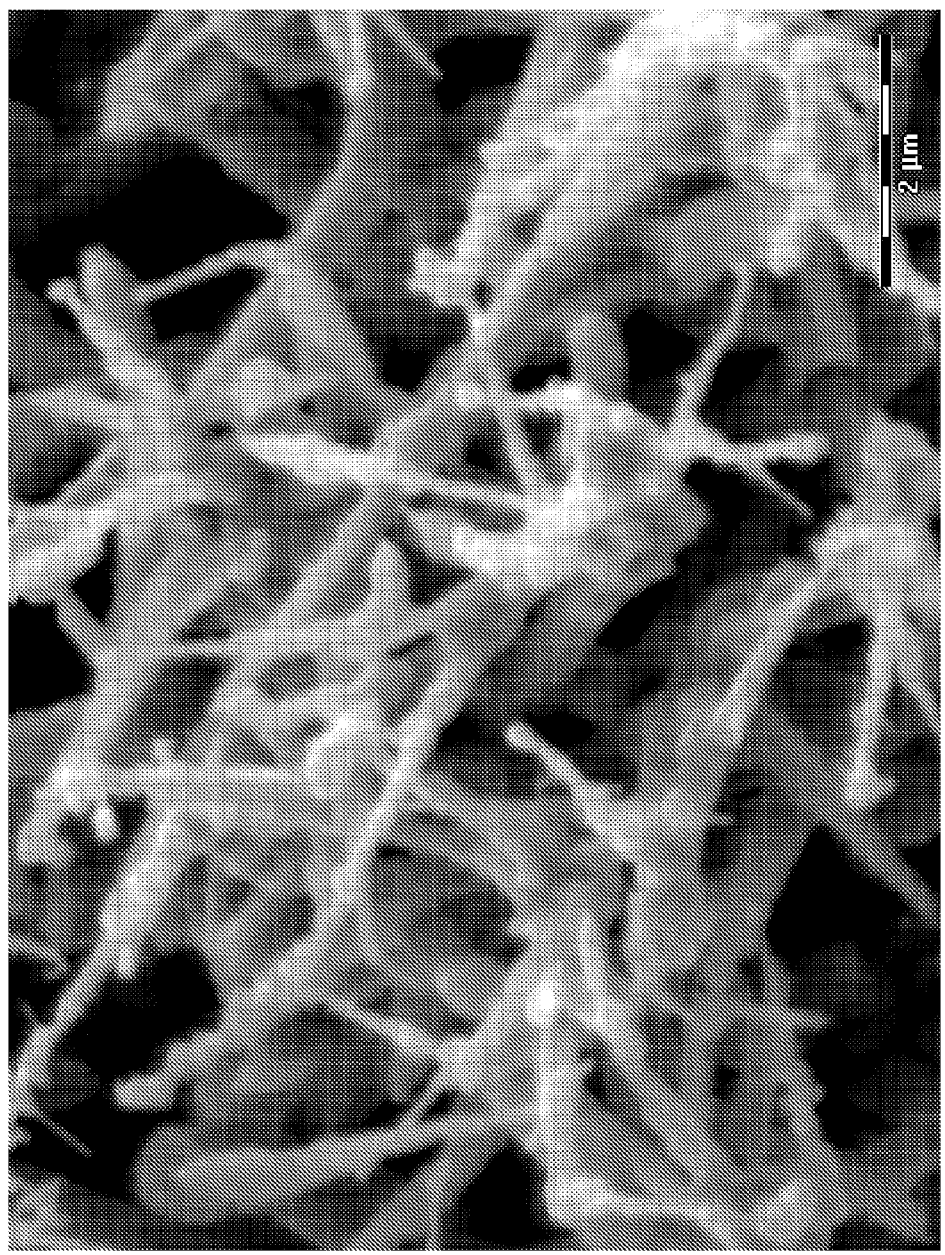
FIG. 4 is another SEM image of a sample formed according to several embodiments of the method of FIG. 2 in accordance with embodiments of the technology.

In certain embodiments, the anode 104 can include a plurality of one-dimensional tin nanostructures, e.g., tin nanoneedles covering 1% or more of the anode 104. As used hereinafter, the phrase "nanoneedles" generally refers to a one-dimensional nanostructure that has a generally constant cross-sectional area or is tapered along at least a portion of its length. Typical dimensions of nanoneedles produced according to the present technology are from about 2 µm to about 5 µm in length, from about 20 nm to about 50 nm in width at the tip, and from about 50 nm to about 200 nm in width at the base. The nanoneedle may also have other suitable dimensions other than the foregoing dimensions in other suitable applications. Examples of such tin nanoneedles are shown in FIGS. 3 and 4.

In certain embodiments, the tin nanoneedles can be produced by electrodeposition in ambient air at temperatures less than about 50° C. without using any templates, as discussed in more detail below with reference to the Examples section. In other embodiments, the anode 104 can also include a plurality of nanowires, nanosprings, nanofibers, and/or other suitable one- or multi-dimensional nanostructures constructed from zinc (Zn), palladium (Pd), tin-copper alloys, zinc-copper alloys, tin-gold alloys, tin-silver alloys, and/or other suitable materials.

The cathode 106 can be constructed from a layered oxide (e.g., lithium cobalt oxide ($LiCoO_2$)), a polyanion (e.g., lithium iron phosphate ($LiFePO_4$)), or a spinel (e.g., lithium manganese oxide ($LiMn_2O_4$)). Other suitable materials for the cathode 106 can include lithium nickel oxide ($LiNiO_2$), lithium iron phosphate fluoride ($Li_2FePO_4F$), lithium cobalt nickel manganese oxide ($LiCo_{1/3}Ni_{1/3}Mn_{1/3}O_2$), $Li(Li_aNi_{x-}Mn_yCo_z)O_2$, and/or other suitable cathode materials.

In certain embodiments, the electrolyte 108 can include a non-aqueous solution of organic carbonates such as ethylene carbonate or diethyl carbonate containing complexes of lithium ions. The electrolyte 108 can contain non-coordinating anion salts such as $LiPF_6$, $LiAsF_6$, $LiClO_4$, $LiBF_4$, and lithium triflate. In other embodiments, the electrolyte 108 may also include an aqueous and/or a partially aqueous solution of lithium salts and/or other suitable compositions.

As shown in FIG. 1A, during discharging, lithium ions 112 are extracted from the anode 104 and migrate toward the cathode 106 via the electrolyte 108. The lithium ions 112 pass through the optional membrane 110 and are inserted into the cathode 106. As a result, a current 114 flows from the cathode 106 past a load 116 to the anode 104. As shown in FIG. 1B, during charging, a charger 118 provides a charging current 120 to the cathode 106. The charging current 120 causes lithium ions 112 to be extracted from the cathode 106 and move toward the anode 104. The lithium ions 112 pass through the optional membrane 110 and are inserted into the cathode 106.

Several embodiments of the lithium-ion battery 100 can have a higher charging capacity than conventional devices. For example, as discussed above, a conventional lithium-ion battery with a carbon-based anode can have a charging capacity of about 372 mA·h/g while several embodiments of the lithium-ion battery 100 can have a charging capacity of about 990 mA·h/g. As a result, the charging capacity of the lithium-ion battery 100 may be improved when compared to conventional lithium-ion batteries.

Several embodiments of the anode 104 of the lithium-ion battery 100 can have improved charging/discharging cyclability. Without being bound by theory, it is believed that several embodiments of the anode 104 can accommodate the large volume changes associated with lithium insertion because the one-dimensional nanostructures are generally freestanding. As a result, these freestanding structures may swell during lithium insertion without causing pulverization and/or other structural damage to the anode 104 as a whole.

Indeed, it has been observed that a lithium-ion battery with several embodiments of the anode 104 retained and even had improved charging capacity for a large number of charge/discharge cycles. For example, at a constant current of 50 µA, and a high charge/discharge rate of 400 mA/g, about 300-400 mA·h/g of the charging capacity was maintained during 25 cycles. Even more surprising, the charging capacity actually increased during the cyclic performance test, as discussed in more detail below with reference to the Examples section.

Figure 2:
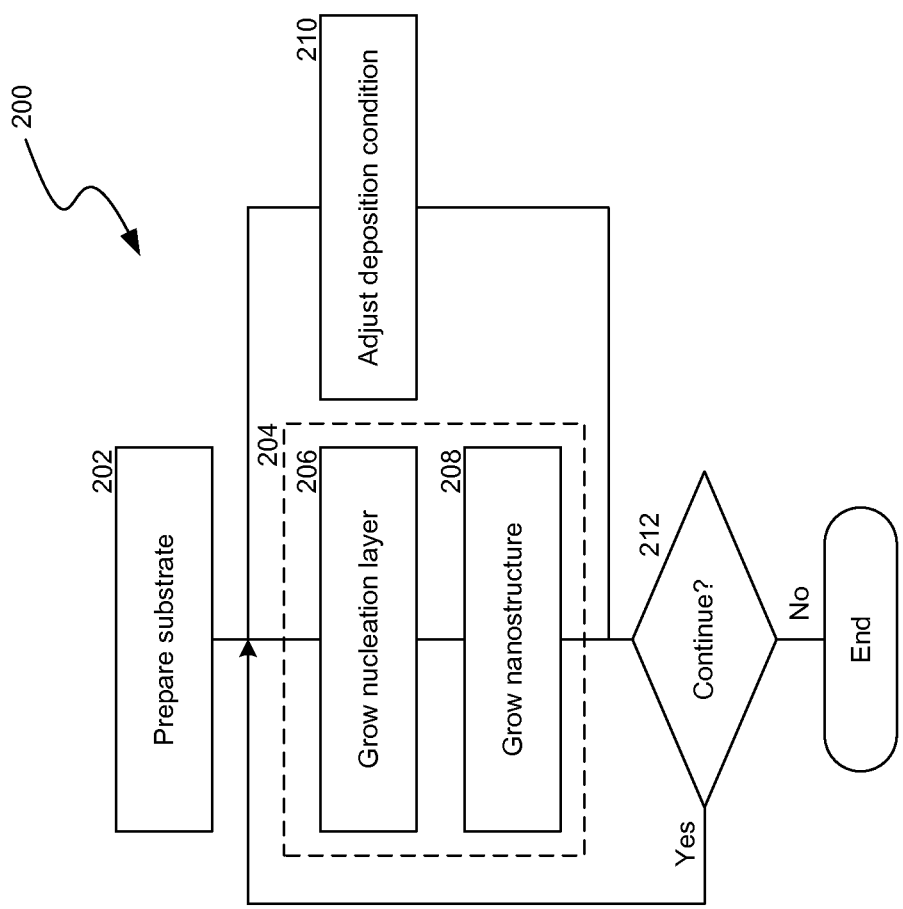
FIG. 2 is a flowchart showing a method of manufacturing an anode suitable for the lithium-ion battery of FIGS. 1A and 1B in accordance with embodiments of the technology.

FIG. 2 is a flowchart showing a method 200 of manufacturing an anode suitable for the lithium-ion battery of FIGS. 1A and 1B in accordance with embodiments of the technology. As shown in FIG. 2, an initial stage (block 202) of the method 200 can include preparing a substrate for electrodeposition. In one embodiment, the substrate can include a copper foil. In other embodiments, the substrate can include a wire, a coil, and/or other structures constructed from a metal, a metal alloy, a polymer, ceramics, and/or other suitable materials.

In certain embodiments, preparing the substrate can include at least one of (a) polishing the substrate (e.g., in a chemical-mechanical polishing process), (b) treating the substrate with a basic solution (e.g., sodium hydroxide), and (c) treating the substrate with an acidic solution (e.g., sulfuric acid). In other embodiments, preparing the substrate can also include treating the substrate with other suitable organic and/or inorganic solutions and/or other suitable processing operations.

Another stage (block 204) of the method 200 can then include forming conductive nanostructures on the substrate. In one embodiment, the nanostructures can be produced by electrodeposition in ambient air at temperatures less than about 50° C. without using any templates. In certain embodiments, the conductive nanostructures can be one-dimensional, e.g., nanoneedles. In other embodiments, the nanostructures can also include a plurality of nanowires, nanosprings, nanofibers, and/or other suitable one- or multi-dimensional nanostructures.

In the illustrated embodiment, forming nanostructures on the substrate includes two separate operations: growing a nucleation layer on the substrate (block 206) and forming nanostructures on the nucleation layer via electrodeposition (block 208). In other embodiments, forming nanostructures may include both of these operations in a single electrodeposition stage. In further embodiments, forming nanostructures can also include growing the nanostructures via chemical vapor deposition, atomic vapor deposition, physical vapor deposition, and/or other suitable techniques.

Another stage (block 210) of the method 200 can also include adjusting at least one deposition condition such that nanostructures are formed on the substrate. In one embodiment, adjusting at least one deposition condition includes adjusting at least one of (a) a deposition temperature, (b) a deposition current density, (c) a deposition environment (e.g., chemical composition of deposition electrolyte), and (d) agitation (or the lack thereof) during deposition. For example, in one embodiment, growing a nucleation layer on the substrate can be at a first temperature (e.g., 50° C.), and forming nanostructures on the nucleation layer can be at a second temperature (e.g., 45° C.). In other embodiments, the first and/or second temperatures can also be at 55° C., 60° C., 65° C., 70° C., 75° C., 80° C., 85° C., and/or other suitable temperatures. In further embodiments, other suitable deposition conditions may also be adjusted.

The method 200 can then include a decision at block 212 of whether the process may continue. If further deposition is desired, then the process reverts to forming conductive nanostructures on the substrate in block 204; otherwise, the process ends.

Several embodiments of the method 200 are simple, readily implemented, and inexpensive to operate because they utilize electrodeposition techniques without templates. Conventional bottom-up synthesis of nanostructures typically includes atom-by-atom deposition that requires precise control. For example, vapor transport and deposition have been used to synthesize one-dimensional nanowires, nanobelts, and nanoribbons. These processes are expensive to operate and have low yield, at least in part because these processes require vacuum processing at high temperatures.

Another conventional technique for synthesizing one-dimensional nanostructures by electrodeposition uses a template on a substrate surface to obtain a desired morphology. For example, the template-assisted synthesis of metal nanowires and nanotubes includes deposition of metal into cylindrical pores or channels of an inert and nonconductive nanoporous substrate. The template greatly affects the size and shape of the deposited nanostructures. However, one drawback of the template-assisted synthesis is the difficulty in preparing suitable templates. Furthermore, such techniques require multiple operations and are frequently not scalable.

Several tests were conducted to form a lithium-ion battery generally similar to the lithium-ion battery 100 of FIGS. 1A and 1B following a method generally similar to the method 200 of FIG. 2. The formed lithium-ion battery was tested for cyclability and charging capacity. The results of the test show that the formed lithium-ion battery has significantly improved cyclability when compared to conventional devices.

EXAMPLE 1

Substrate material: pure Cu foils (99.99% pure, Alfa Aesar Inc.), size: 25 mm×25 mm×1 mm. Coupons were cut from the Cu foils and polished using standard metallographic techniques. Prior to electroplating, the substrates were cleaned in a sodium hydroxide solution at 50° C. and then immersed in concentrated sulfuric acid to remove surface oxide. The substrates were then electroplated under the following conditions:

Electrolyte: Sodium tin (IV) oxide—142 g per liter solution
Sodium hydroxide—15 g per liter solution
Plating conditions were monitored, and typical values are listed below:
1. Temperature: 35° C. to 85° C.
2. Current density: 45 mA/cm$^2$ to 70 mA/cm$^2$
3. Film thickness: 1 µm to 10 µm
4. Solution agitation
5. Distance between electrodes: 1 inch
6. Surface finish of substrate: as received, polished with 0.05 µm alumina suspension, and scratched.

Figure 5:
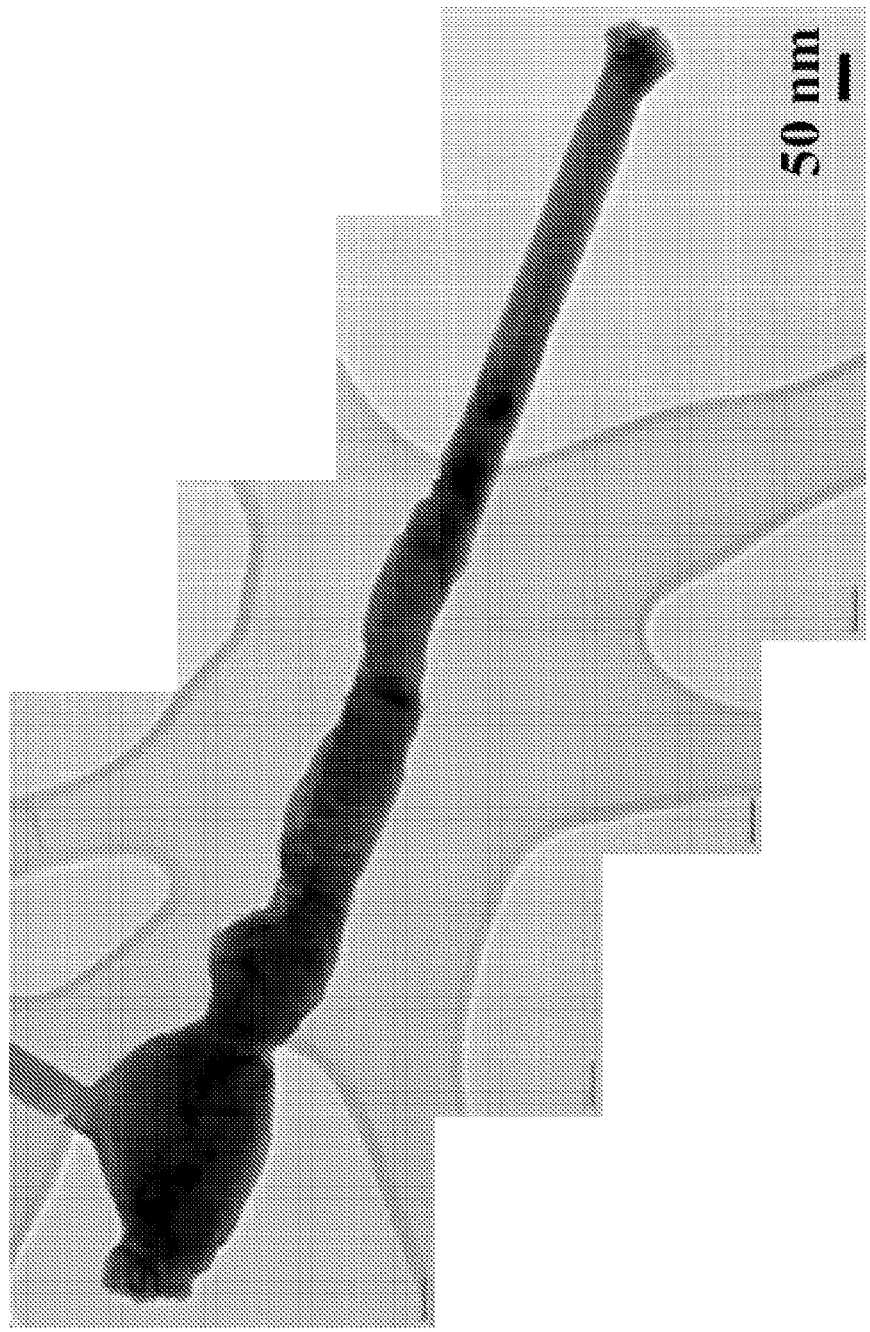
FIG. 5 is a composite transmission electron microscope (TEM) image of a sample formed according to several embodiments of the method of FIG. 2 in accordance with embodiments of the technology.

FIGS. 3 and 4 are SEM photos of a sample formed in the foregoing plating process. As shown in FIGS. 3 and 4, the plated tin formed a plurality of randomly extending nanoneedles. FIG. 5 shows a TEM image of a single nanoneedle that was removed from the substrate. The current density used to obtain the nanostructures depicted in FIGS. 3, 4, and 5 was 46 mA/cm$^2$. The electroplating process was started at 50° C., and the temperature was then decreased to 45° C. after 2 minutes. The total plating time was 7 minutes and 54 seconds. The substrate surface was polished with an 0.05 µm alumina suspension. The distance between the electrodes was 1 inch, and the electrolyte was stirred during the electroplating process.

Figure 6:
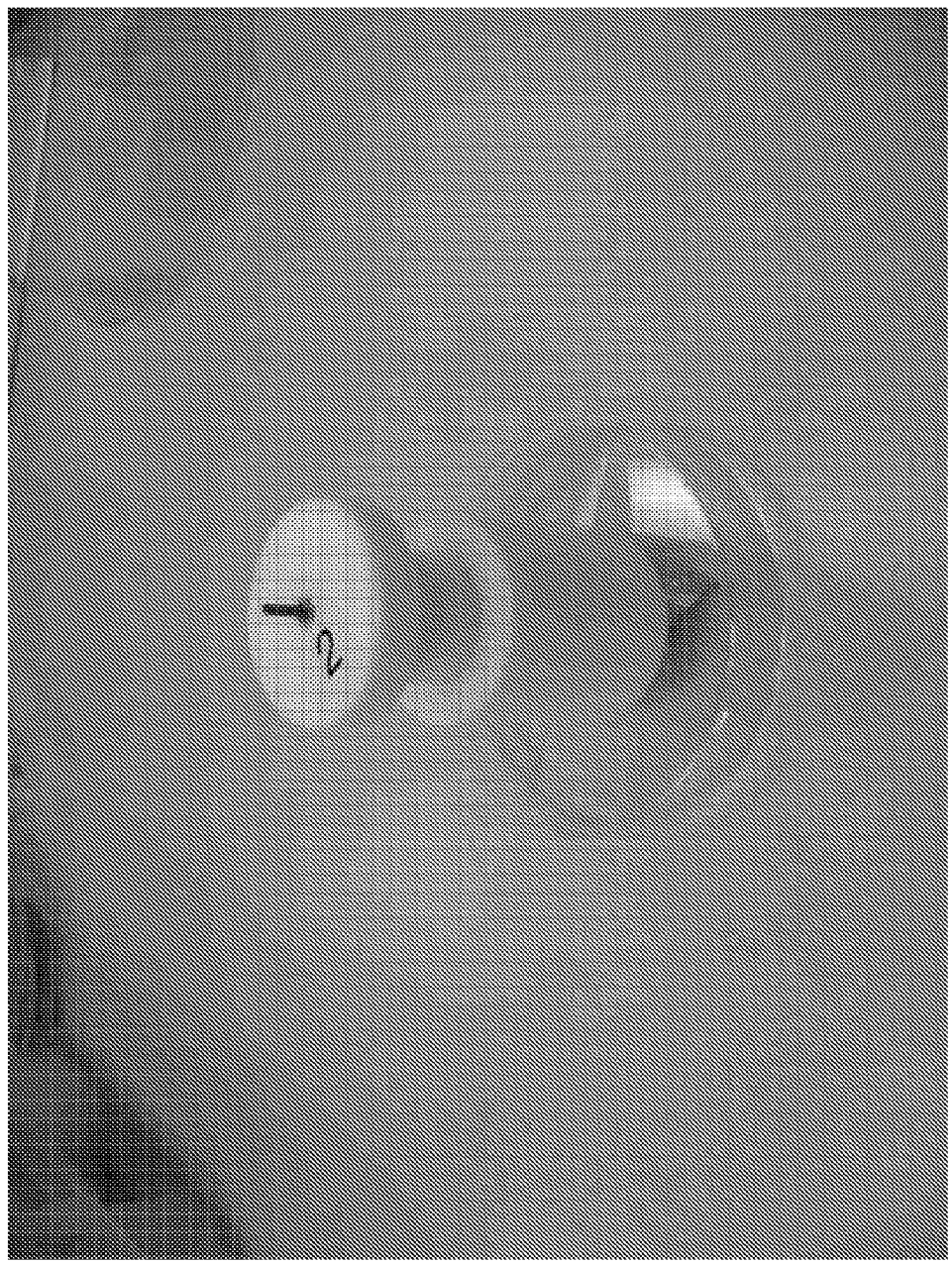
FIG. 6 is a perspective view of a lithium-ion battery formed during testing in accordance with embodiments of the technology.
Figure 7:
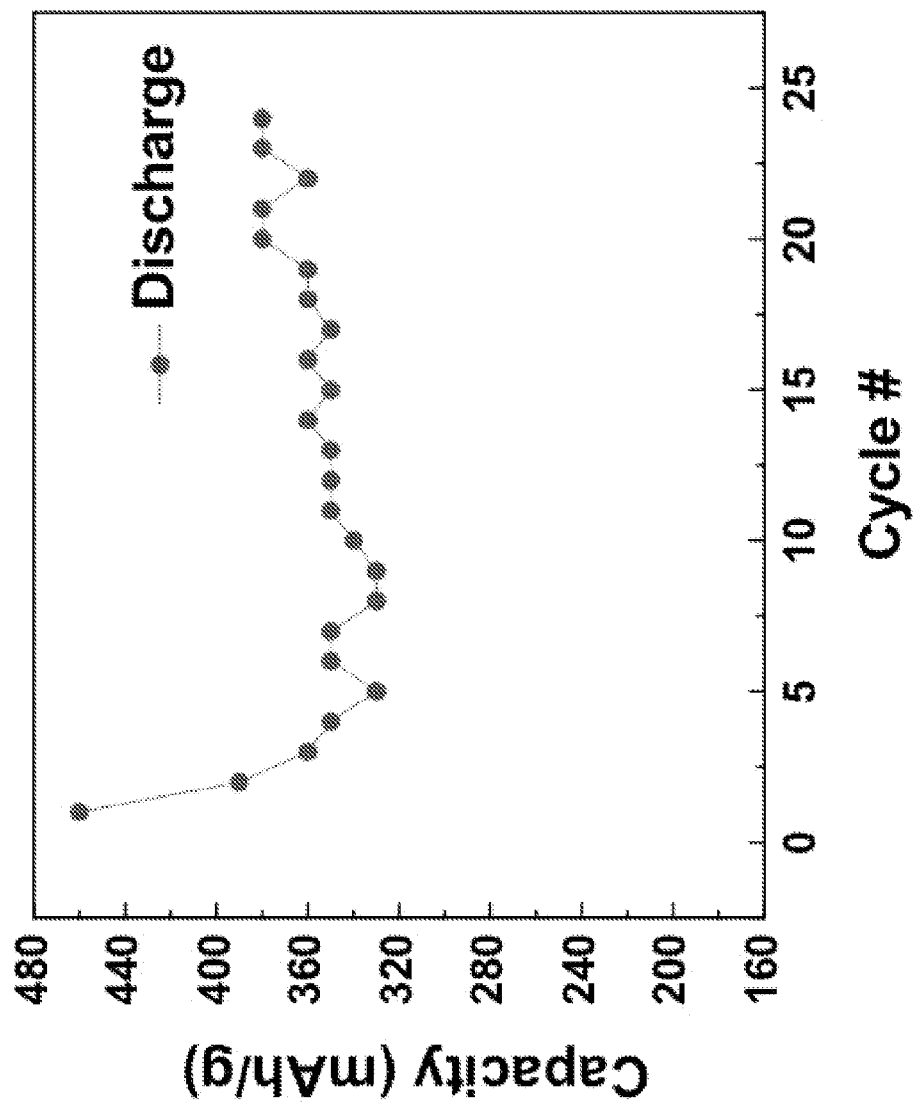
FIG. 7 is a plot of discharging capacity versus number of discharge cycles for a sample formed according to several embodiments of the method of FIG. 2 in accordance with embodiments of the technology.

Anode Performance Testing:

FIG. 6 is a perspective view of a lithium-ion battery formed during testing in accordance with embodiments of the technology. The lithium-ion battery was formed as a coin cell assembled in an argon-filled glove box using Celgard 480 as a separator, 1M LiPF$_6$ in ethylene carbonate (EC)/dimethyl carbonate (DMC) (1:1 volume ratio, Aldrich) as electrolyte, and lithium foil (Alfa Aesar Inc.) as a counter electrode. Testing was done galvanostatically at a current of 50 µA. At a constant current of 50 µA, and a high charge/discharge rate of 400 mA/g, about 300-400 mA·h/g of the discharging capacity was maintained during 25 cycles. As shown in FIG. 7, the discharging capacity actually increased during a portion of the cyclic performance test.

EXAMPLE 2

In another test, the effect of the temperature of the electrodeposition process on the size, shape, and morphology of surface features was studied. The surface morphology (as described by plating thickness, grain shape, size, and orientation) depends on various plating variable such as film thickness, current density, type of anion, plating temperature, solution agitation, and/or other variables.

Procedure:

Plates of Cu, 25 mm×25 mm×1 mm, were cut and polished using standard metallographic techniques. Prior to electroplating, the substrates were cleaned in a sodium hydroxide solution maintained at 50° C. and then immersed in concentrated sulfuric acid to remove any surface oxide. The prepared plates were electroplated with tin using an alkaline electrolyte of the following composition: 142 g sodium tin (IV) oxide per liter of solution and 15 g sodium hydroxide per liter of solution. Plating was conducted for about 240 seconds (for a thickness of 5 mm) at a current density of 50 mA/cm$^2$. The temperature of the plating was varied between 35° C. to 85° C.

The samples were washed and dried immediately after electroplating and examined visually as well as by using a FEI Sirion field emission scanning electron microscope (FESEM) equipped with an energy dispersive spectrometry (EDS) system and operated at 10 kV to 20 kV. The samples were subsequently aged at room temperature in air. All aged samples were periodically examined using the FESEM.

Figure 8:
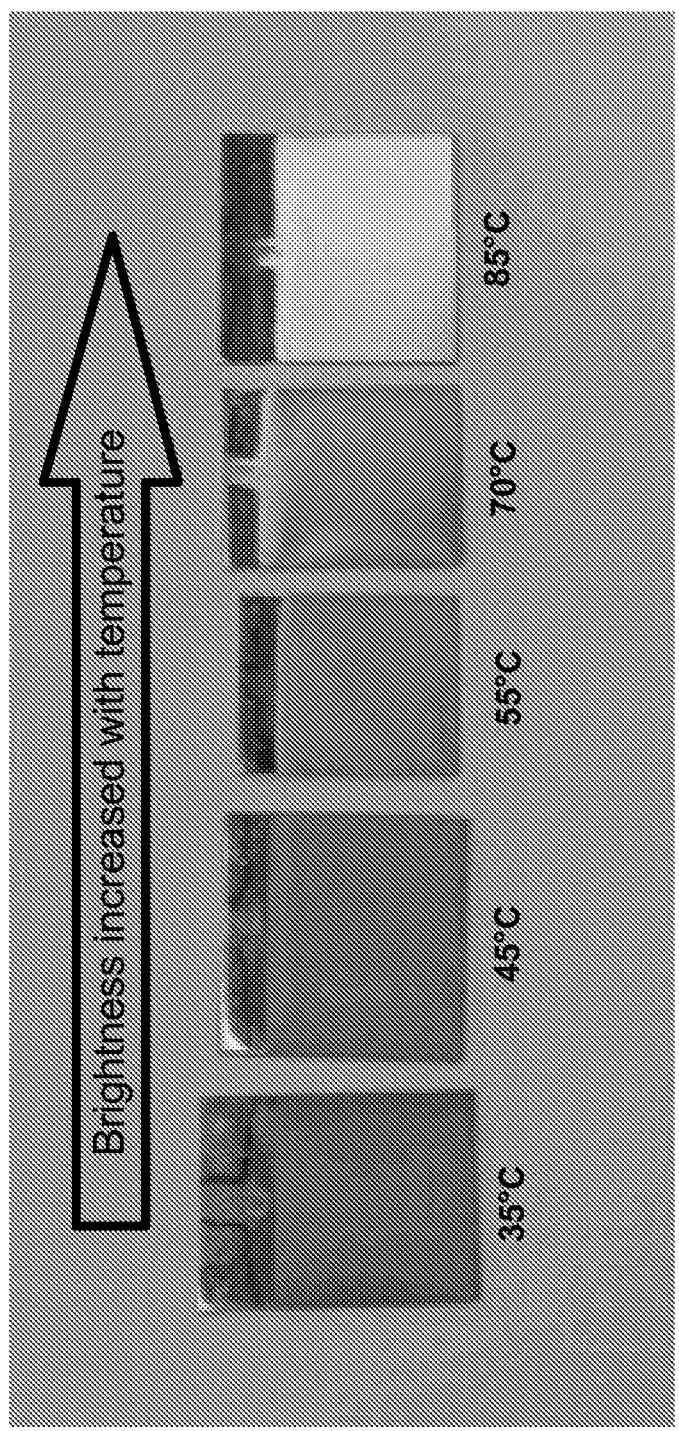
FIG. 8 shows a series of high resolution photographs of reflectivity of samples with plating temperatures in accordance with embodiments of the technology.

FIG. 8 is a series of high-resolution photographs showing the variation in brightness (reflectivity) of the samples with different plating temperatures. The sample plated at 25° C. appears dull (low reflectivity), whereas the sample plated at 85° C. appears brightest. The brightness of the plated samples increased with the increase in plating temperature.

Figure 9:
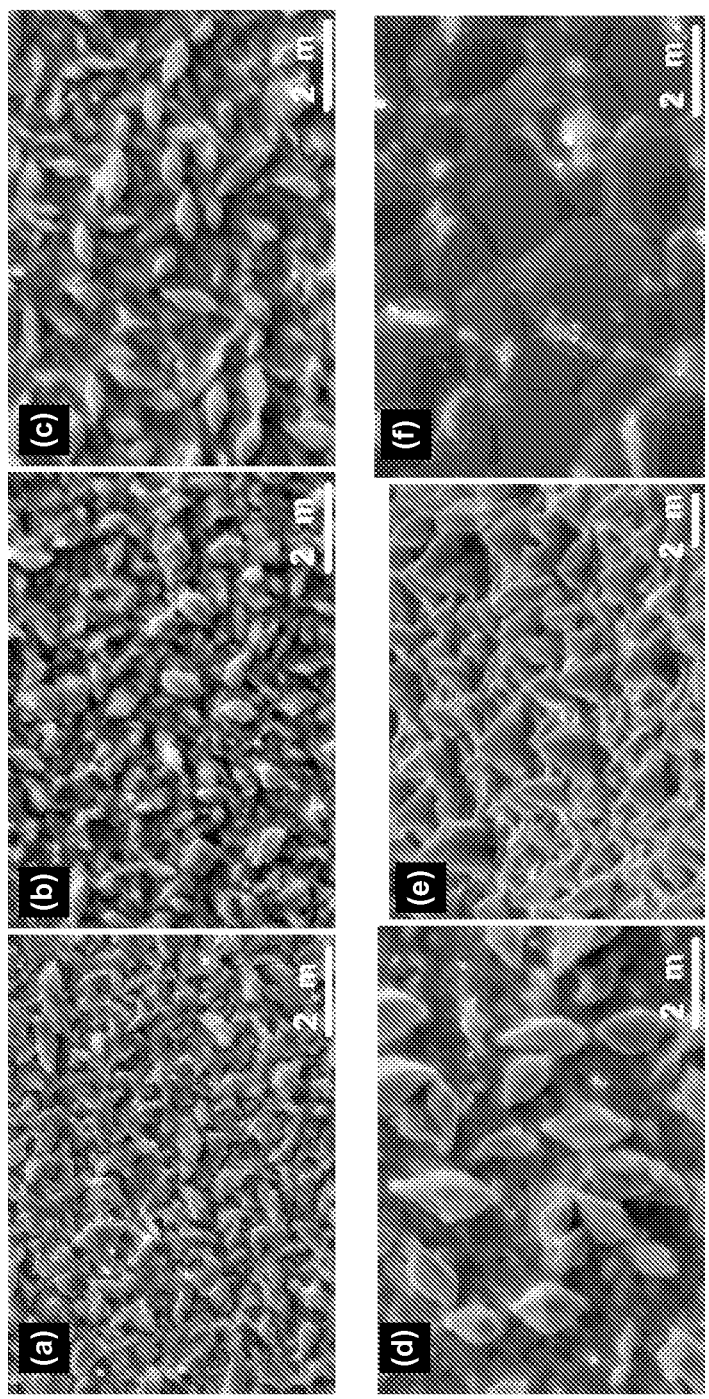
FIG. 9 shows SEM images of samples plated at different temperatures in accordance with embodiments of the technology.

FIG. 9 shows SEM images of samples plated at different temperatures. As shown in FIG. 9a, the surface of the sample plated at 35° C. is very irregular and highly porous. This is consistent with the poor reflectivity of the sample in FIG. 8. At plating temperatures of 45° C., 55° C., and 70° C. (FIGS. 9b-e), pyramid-shaped features formed on the surface. These pyramid-shaped features were identified to be pure tin. The underlying film became increasingly smooth with increases in temperature.

Without being bound by theory, during electrodeposition, every time a metal ion is discharged from the electrolyte, a high temperature adatom is generated. These adatoms contact the substrate surface and finally "freeze" to form a solid film. It is believed that the cooling rate at least influences or determines the extent of grain growth and the resulting grain size of the plated structures. The higher the temperature of the plating solution (substrate), the slower the cooling rate of these adatoms. Thus, at higher temperatures, the adatoms can diffuse for longer distances on the substrate surface before freezing. Therefore, with an increase in the plating temperature, the grain size increases and the film surface becomes increasingly smooth. Increasing the plating temperature to 85° C. resulted in the formation of large faceted grains (FIG. 9f).

It is also believed that surface protrusions form during electroplating after a certain critical thickness when there is an accumulation of metal ions. In the initial stages of plating, the metal ions are uniformly distributed over the substrate. After a certain thickness, a metal-ion denuded layer (MIDL) is created over the surface. The thickness of the MIDL varies due to the variation in the discharge activity along the substrate surface. Metal ions are supplied preferentially through thinner MIDL regions, ultimately resulting in the nucleation of surface protrusions.

As noted above, the underlying surface became increasingly smooth with increases in temperature. This would decrease the number of sites where the adatoms can be adsorbed. Hence, the number of nucleation sites and nucleation rates of the pyramidal features would decrease with an increase in plating temperature. It is believed that the smaller the number of nucleation sites, the faster protrusions can grow. After the protrusions nucleate, new metal ions get preferentially discharged at their tip due to high local current density. The size of the pyramid-shaped surface features indeed increased with increases in plating temperature, whereas their density decreased as shown in FIGS. 9b-9d.

Figure 10:
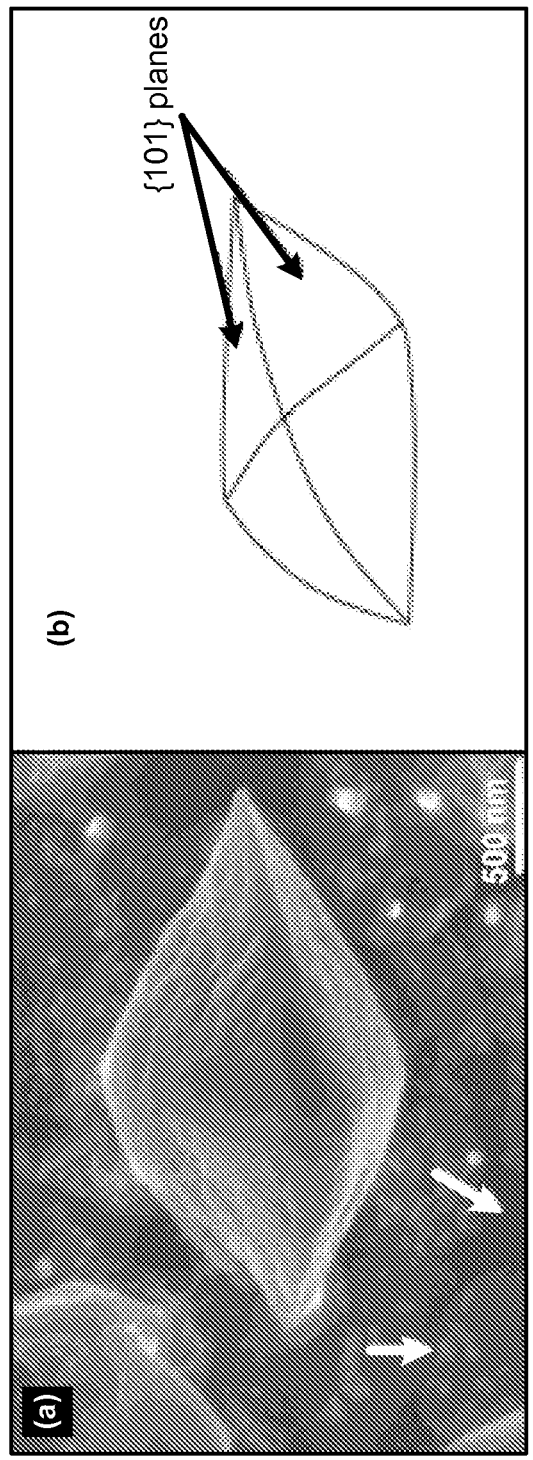
FIG. 10 shows a SEM image and a schematic of a pyramid-shaped protrusion formed in a 70° C. sample in accordance with embodiments of the technology.

It is also believed that the pyramid-shaped protrusions formed in order to minimize the overall surface energy by exposing the lowest energy plane of tin. The crystal structure of tin is tetragonal, and it belongs to the space group I41/amd. The lowest surface energy planes of such a structure are believed to be the {101} planes. Therefore, these pyramids will be bound by four equivalent {101} surfaces. FIG. 10 shows a high-resolution SEM image and a schematic of one of the pyramid-shaped protrusions formed in a 70° C. sample. Faceted grain boundaries (shown by white arrows in FIG. 10a) similar to those seen in 85° C. samples are seen in the underlying film.

Figure 11:
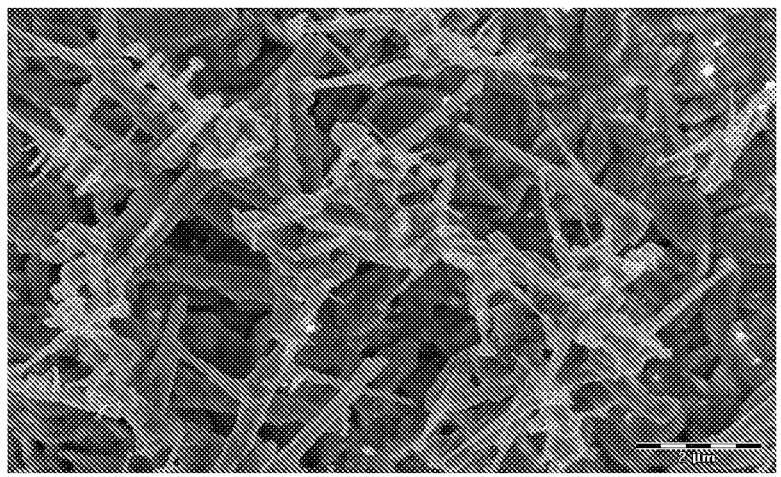
FIG. 11 is a SEM image of a sample formed according to several embodiments of the method of FIG. 2 before undergoing charge/discharge cycles.
Figure 12:
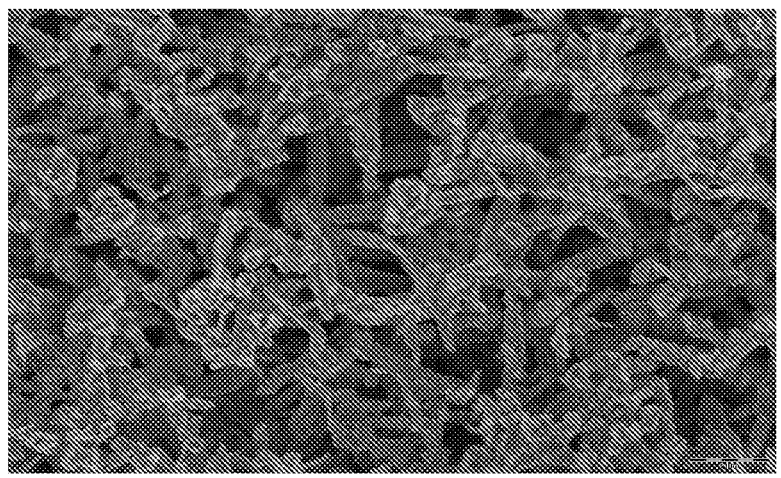
FIG. 12 is a SEM image of the sample in FIG. 11 after undergoing 100 charge/discharge cycles.
Figure 13A:
FIG. 13A is a TEM image of a nanoneedle of the sample in FIG. 11.
Figure 13B:
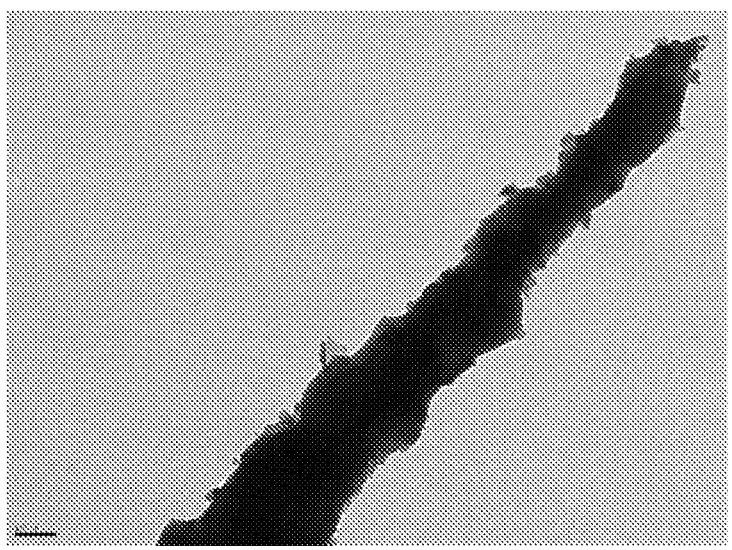
FIG. 13B is a TEM image of the nanoneedle in FIG. 13A after 100 charge/discharge cycles.

Experiments were conducted to test the cycle response of the formed samples. FIG. 11 is a SEM image of a sample formed according to several embodiments of the method of FIG. 2 before undergoing charge/discharge cycles, and FIG. 12 is a SEM image of the sample after undergoing 100 charge/discharge cycles. FIG. 13A is a TEM image of a nanoneedle of the sample in FIG. 11 before charge/discharge, and FIG. 13B is a TEM image of the nanoneedle in FIG. 13B after 100 charge/discharge cycles. As shown in FIGS. 11-13B, the formed nanoneedles generally maintained their structural integrity and shape after 100 charge/discharge cycles.

Figure 14:
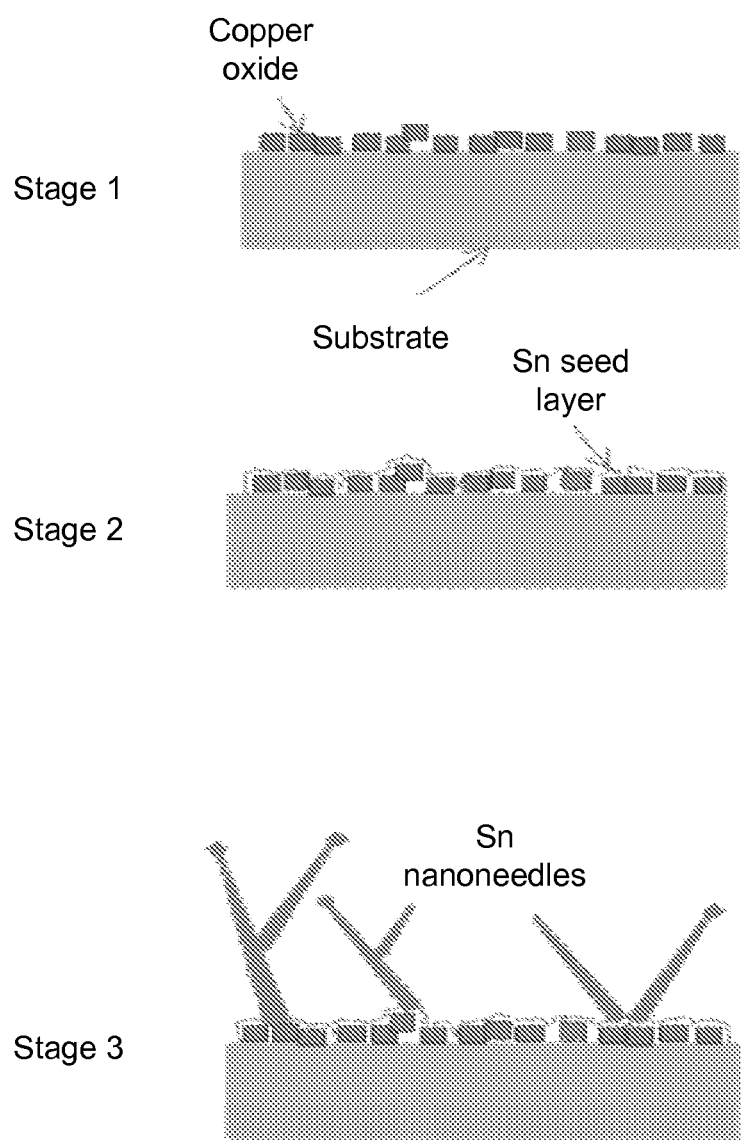
FIG. 14 schematically illustrate stages of a process for forming nanoneedles in the samples of FIG. 2.

FIG. 14 illustrates stages of a process for forming nanoneedles in the samples of FIG. 2. In the illustrated example, a copper substrate was used with copper oxide (Cu$_2$O) surface layers for forming tin (Sn) nanoneedles. In other examples, other suitable substrate materials and/or nanoneedles may also be formed following similar process stages.

As shown in FIG. 14, at stage I, copper oxide is formed on the surface of the copper substrate via oxidation. At stage II, a thin tin seed layer is formed on the copper oxide surface layer. Subsequently, at stage III, tin nanoneedles grow from the tin seed layer to form different "branches."

Figure 15E:
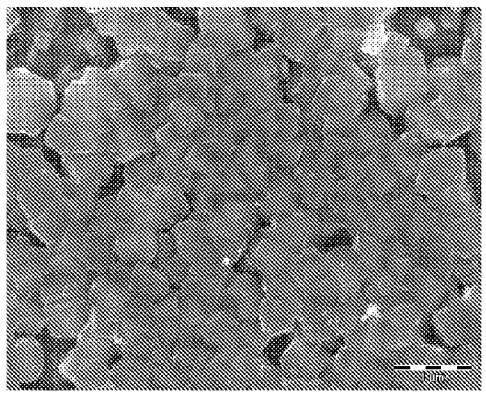
Figure 15E:
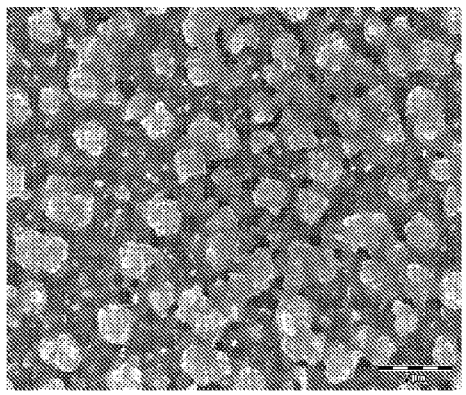
Figure 15E:
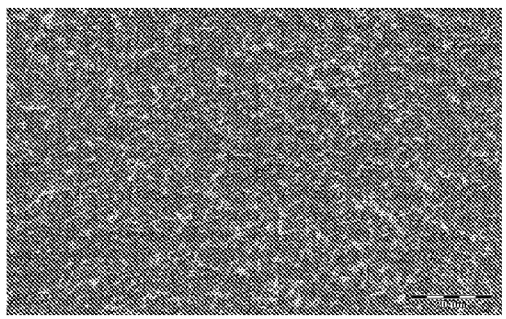
Figure 15E:
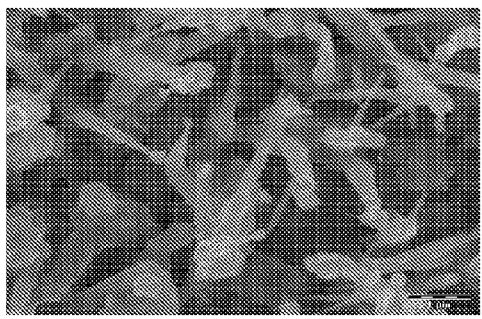
Figure 15E:
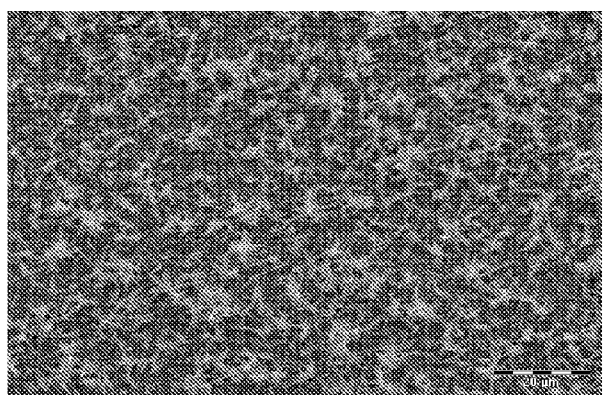

FIGS. 15A-E are SEM images of a sample undergoing the stages of FIG. 14. As shown in FIG. 15A, copper oxide crystals formed on the copper substrate when the substrate was 'soaked' in an electrolyte for 60 minutes. As shown in FIG. 15B, electroplating tin on the copper substrate for 67 seconds (1 μm intended thickness) resulted in generally complete coverage of the copper oxide crystals and the formation of a tin seed layer. As shown in FIG. 15C, further increasing the plating time resulted in instability in the tin seed layer. As a result, some tin nanoneedles grew in the regions of high instability. FIG. 15C shows formation of some tin nanoneedles when the plating time was 5 minutes 37 seconds. As shown in FIG. 15D, the surface density of tin nanoneedles increased with further increase in the plating time. FIG. 15D shows nanoneedles that formed upon 'soaking' and plating for 11 minutes 15 seconds.

From the foregoing, it will be appreciated that specific embodiments of the technology have been described herein for purposes of illustration, but that various modifications may be made without deviating from the disclosure. In addition, many of the elements of one embodiment may be combined with other embodiments in addition to or in lieu of the elements of the other embodiments. Accordingly, the disclosure is not limited except as by the appended claims.

We claim:

1. A lithium-ion battery comprising:
   an electrolyte;
   a cathode in contact with the electrolyte; and
   an anode spaced apart from the cathode and in contact with the electrolyte, the anode including:
      a substrate including a metallic material;
      a nucleation layer grown on the substrate; and
      a plurality of freestanding conductive nanostructures directly formed on the nucleation layer and covering 1% or more of a surface of the anode.

2. The lithium-ion battery of claim 1 wherein the plurality of freestanding conductive nanostructures include a plurality of nanoneedles.

3. The lithium-ion battery of claim 1 wherein the plurality of freestanding conductive nanostructures include a plurality of nanoneedles individually having a generally constant cross-sectional area or tapered along at least a portion of a length of the individual nanoneedles.

4. The lithium-ion battery of claim 1 wherein the plurality of freestanding conductive nanostructures include a plurality of tin (Sn) nanoneedles individually having a generally constant cross-sectional area or tapered along at least a portion of a length of the individual nanoneedles.

5. The lithium-ion battery of claim 1 wherein the plurality of freestanding conductive nanostructures include a plurality of tin (Sn) nanoneedles individually having a base and a tip, wherein the individual tin nanoneedles are about 2 μm to about 5 μm in length between the base and the tip, about 20 nm to about 50 nm in width at the tip, and about 50 nm to about 200 nm in width at the base.

6. The lithium-ion battery of claim 1 wherein the plurality of freestanding conductive nanostructures include one- and/or multi-dimensional nanostructures.

7. The lithium-ion battery of claim 1 wherein the plurality of freestanding conductive nanostructures include at least one of nanoneedles, nanowires, nanosprings, or nanofibers.

8. The lithium-ion battery of claim 1 wherein the plurality of freestanding conductive nanostructures include at least one of nanoneedles, nanowires, nanosprings, or nanofibers constructed from at least one of tin (Sn), palladium (Pd), a tin-copper alloy, a zinc-copper alloy, a tin-gold alloy, or a tin-silver alloy.

9. The lithium-ion battery of claim 1 wherein each of the plurality of freestanding conductive nanostructures includes tin (Sn), and wherein the metallic material of the substrate includes copper.

10. The lithium-ion battery of claim 1 wherein the nucleation layer, on which the plurality of freestanding conductive nanostructures are directly formed, is a film.

11. The lithium-ion battery of claim 1 wherein the film has a thickness of about 1 μm to about 10 μm.

\* \* \* \* \*